United States Patent [19]

Miller

[11] Patent Number: 4,494,210
[45] Date of Patent: Jan. 15, 1985

[54] ENROUTE WEIGHT COMPUTER FOR AIRCRAFT

[75] Inventor: Harry Miller, Scottsdale, Ariz.

[73] Assignee: Sperry Corporation, New York, N.Y.

[21] Appl. No.: 333,097

[22] Filed: Dec. 21, 1981

[51] Int. Cl.³ ............... G01G 19/00; G06F 11/30; G08G 5/00

[52] U.S. Cl. .................... 364/567; 364/424; 364/510; 340/603; 340/612; 340/945

[58] Field of Search ............ 364/424, 442, 463, 567, 364/509, 560, 564, 510; 340/27 R, 945, 971, 973, 603, 612, 618, 620; 318/642; 244/194

[56] References Cited

U.S. PATENT DOCUMENTS

| | | | |
|---|---|---|---|
| 3,527,096 | 9/1970 | Cohn et al. | 318/642 X |
| 3,612,837 | 10/1971 | Brandau | 364/442 X |
| 3,789,665 | 2/1974 | Hohenberg | 364/510 X |
| 4,258,422 | 3/1981 | Dougherty et al. | 364/424 X |
| 4,437,162 | 4/1984 | Kato | 364/424 X |

Primary Examiner—Errol A. Krass
Assistant Examiner—Kevin J. Teska
Attorney, Agent, or Firm—Howard P. Terry

[57] ABSTRACT

A measure of the enroute weight of an aircraft is continuously provided by determining the zero fuel weight during takeoff, adding the weight of total fuel as measured by fuel quantity sensors, interrupting the latter measure and holding its then current value whenever the fuel quantity sensors may be in error, such as when the aircraft is not level or during aircraft accelerations, and during this time computing the rate of change of aircraft weight as a function of aerodynamic and engine parameters and subtracting the time integral of this computed value from the held fuel quantity sensor value. Upon the aircraft resuming level, unaccelerated flight, the integrator is reset and the sensed fuel quantity measure restored.

7 Claims, 2 Drawing Figures

ENROUTE WEIGHT COMPUTER FOR AIRCRAFT

BACKGROUND OF THE INVENTION

1. Field of the Invention

The present invention relates generally to aircraft performance management systems (PMS) for controlling an aircraft in the most efficient manner possible, particularly with the objective of fuel conservation. More specifically, the invention relates to computer apparatus for continuously and accurately providing a measure of the actual enroute weight of the aircraft.

2. Description of the Prior Art

Aircraft weight is one of the most important and critical parameters used in a PMS and the accuracy of such measure contributes significantly to achieving the system's ultimate goal. In the present inventor's copending application entitled "Takeoff Weight Computer Apparatus for Aircraft", Ser. No. 333,098, filed Dec. 21, 1981 and assigned to the present assignee, apparatus is disclosed for computing the takeoff weight of an aircraft. The present invention may use this apparatus for providing a measure of aircraft weight during the ensuing enroute portion of a flight. However, in its broadest aspect, any measure of aircraft takeoff or initial weight may be used, such as for example, its manifest weight, without seriously affecting the accuracy of the enroute weight measure. Also, other techniques for providing a continuous measure of enroute weight have been proposed in the past. Two such techniques are disclosed in the present inventor's U.S. Pat. Nos. 3,691,356 and 4,110,605, both assigned to the present assignee. In both of these patents aircraft weight is computed solely on the basis of the aircraft design parameters and the aerodynamic forces acting on the aircraft and maintaining it in flight; broadly speaking, determining the lift required to support its weight. While these techniques are valid and have proved successful, they are quite complex and require precise measurements of aerodynamic forces and considerable complex computations.

The present invention provides a very accurate measure of enroute weight without the complexity of the prior art systems. In a modern jet transport aircraft in enroute flight, the primary variable affecting aircraft weight is the weight of fuel being consumed. The weight of fuel may, of course, be determined from sensors of the quantity of fuel in the aircraft fuel cells or tanks, which sensors are sufficiently accurate in level, unaccelerated flight to provide an accurate measure of aircraft weight attributable to fuel load. However, since such sensors normally measure the surface level of the fuel in each tank, the measure of fuel will be inaccurate whenever the aircraft is not level (or substantially level) or experiences an acceleration because of fuel surface level changes. Since in enroute flight, extended periods of unlevel and/or accelerated flight may occur, another source of fuel quantity change is required during these periods.

SUMMARY OF THE INVENTION

The present invention provides a continuous and accurate measure of aircraft weight during enroute flight using as a basic parameter the weight of the fuel in the fuel tanks as measured by fuel quantity sensors associated with the tanks. Initially, and before or during a takeoff, the weight of the aircraft with no fuel is determined. This may be done by computing the takeoff weight using thrust, acceleration, and rolling friction measures as in the referenced application or by using manifest weight and subtracting therefrom the initial known fuel quantity. To this zero fuel weight term is added the summed measure of fuel in the fuel tanks to derive the actual aircraft weight measure, which measure will, of course, decrease as fuel is consumed. Since the fuel quantity sensors are inaccurate when the aircraft pitches and/or when the aircraft accelerates, a longitudinal accelerometer. preferably of the liquid level type, provides a signal when its output exceeds a predetermined value, which signal is used to interrupt and hold the then existing measure of fuel quantity from the fuel quantity sensors. During the time that the accelerometer signal exceeds the threshold value, it is used to initiate an integrator responsive to a signal proportional to the rate of change of fuel quantity weight derived from measures independent of the fuel quantity sensors, the output of the integrator being supplied in place of the fuel quantity sensor weight measures. The latter measure of fuel weight is derived from a fuel flow computer responsive to engine operation parameters, aerodynamic data and ambient atmospheric data or directly from the fuel flow sensors normally on the aircraft.

BRIEF DESCRIPTION OF THE DRAWINGS

The preferred embodiment of the present invention is illustrated in the attached drawings wherein.

DESCRIPTION OF THE PREFERRED EMBODIMENT

The enroute weight computer of the present invention is broadly based on a determination of the zero fuel weight of the aircraft and the inherent long term accuracy and reliability of the aircraft's fuel quantity sensors. Since, as stated, the primary weight variable of an aircraft during enroute flight is fuel quantity, it is only necessary to determine initial or takeoff weight and then continuously subtract the weight of the fuel consumed as the flight proceeds to provide a continuous measure of aircraft enroute weight. However, a problem arises in accurately keeping track of fuel used under all flight conditions normally experienced from takeoff, climb to cruise altitude, letdown, and approach. In normal steady state cruise, for example, the most accurate way of keeping track of fuel consumed is through use of the aircraft's fuel quantity sensors. In most cases, these sensors are generally conventional liquid level sensors, sometimes referred to as electronic dip sticks, which measure (some through capacitive coupling) the fuel level in each of the aircraft fuel tanks and thus supply an electrical output proportional to such fuel level. Such sensors are usually calibrated to read out fuel quantity in pounds rather than gallons, for example. Since the sensors are liquid level sensors, they respond to fluid movement within the tanks and will thus supply erroneous weight information if the aircraft is unlevel in pitch or if the aircraft accelerates or decelerates. It will be appreciated that there should be no erroneous reading when the aircraft changes its roll attitude since such roll is controlled by the pilot, human or automatic, to be coordinated with rate of turn; that is, the aircraft experiences no lateral acceleration. Since under certain modes of enroute flight, the aircraft can experience extended periods of acceleration, i.e., during captures of commanded speed changes, and extended periods of substantial pitch up and pitch down, i.e., during climbs to altitude and during letdowns from altitude, the fuel quantity sensors will be in error during such times.

The present invention provides apparatus for compensating the accurate long term actual weight computation during steady state cruise for the relatively short term effects of accelerations and/or sustained substantial pitch attitudes. This is accomplished by providing another source of fuel quantity depletion which is not effected by acceleration and attitude and using this latter measure in place of the fuel quantity measure whenever the aircraft experiences such accelerations and changes of pitch attitude.

Figure 1:
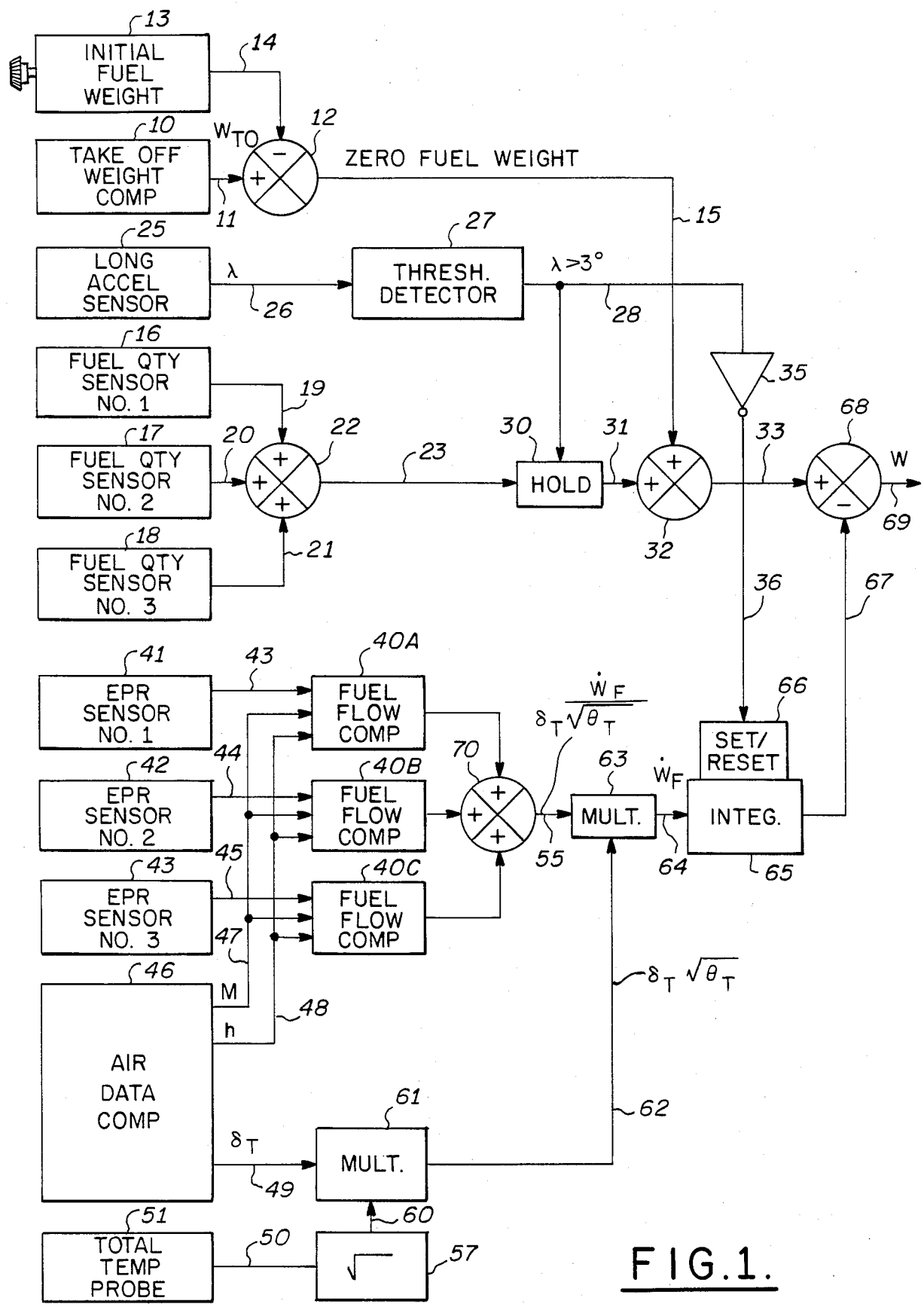
FIG. 1 is a block diagram of apparatus for carrying out the present invention.

Referring now to FIG. 1, an apparatus for carrying out the principles of the present invention will be described. Since the total enroute weight of the aircraft is to be determined primarily by the weight of onboard fuel, it is necessary to determine its zero fuel weight. Preferably, this is accomplished during the first few seconds of takeoff acceleration using a takeoff weight computer 10 of the type disclosed in the above-referenced present inventor's copending application Ser. No. 33,098, filed Dec. 21, 1981. Alternatively, for the present application, it is possible to use the manifest weight. The output of the takeoff weight computer appears on lead 11 and is supplied to summing junction 12. The total weight of onboard fuel for any flight, herein defined as initial or preflight fuel weight, is normally always available to the pilot, usually as part of the takeoff manifest. The pilot enters this numerical quantity by means of any suitable input device such as a knob or keyboard input to initial fuel weight device 13 having a suitable conventional numeric display and providing an output on lead 14 proportional to manifest fuel weight. This signal is subtracted from the total takeoff weight signal in summing junction 12 resulting in an output or signal on lead 15 proportional to the zero fuel weight of the aircraft.

An accurate measure of actual fuel quantity is provided by a plurality of liquid level sensors such as sensors 16, 17, 18 associated with the aircraft's fuel tanks or cells. These sensors are well known devices, such as electrical capacitance devices which are calibrated to read out fuel quantity in pounds of fuel remaining and provide signals on leads 19, 20 and 21 proportional to such measures. These signals are conventionally summed as at summer 22 to provide a signal on lead 23 proportional to the weight of total fuel on the aircraft.

Since the fuel quantity sensor signals electrically represent the free surface level of the fuel in the tanks they are subject to errors whenever the aircraft pitches up and down from level flight and also whenever the aircraft experiences a longitudinal acceleration. Clearly, such situations can occur a number of times during an enroute flight. For example, during and after takeoff when the aircraft rotates to capture $V_2$ and during initial and second segment climb, during acceleration to flap retraction speed, during climb to past 10,000 feet when the aircraft accelerates to optimum climb speed, contant Mach climb, and flare to selected flight level, the latter acceleration may also be accompanied by pitch changes. During enroute cruise, the aircraft may be required to change altitudes again involving pitch changes and/or longitudinal accelerations. Similarly, pitch changes and/or decelerations occur during descent and letdown to approach altitude. During such periods, the fuel quantity sensors cannot be relied upon to provide an accurate measure of fuel weight and hence total aircraft weight. According to the present invention, there is provided a means to detect such aircraft pitching and accelerations and to provide during such periods an alternative source of aircraft fuel weight not effected by craft motion, which means will now be described.

The means for detecting pitch attitude changes and aircraft longitudinal accelerations comprises a longitudinal accelerometer 25, such as, and preferably, a toroid fluid level sensor of the type disclosed in assignee's U.S. Pat. Nos. 3,823,486 and 4,028,815. With this type of sensor, the free fluid surface in the accelerometer corresponds to the free fluid surface in the fuel tanks. It will be appreciated, of course, that different forms of accelerometers may be used. The output $\lambda$ of accelerometer 25 is supplied via lead 26 to a threshold detector 27 which may be any suitable conventional analog or digital apparatus for detecting an accelerometer output signal greater than a predetermined value and which supplies, for example, a negative or "0" logic signal when the accelerometer output corresponds to less than $\pm 3°$, for example, of tilt (pitch or acceleration) and a positive or "1" logic signal when such signal is greater than $\pm 3°$. Such logic signal appears on lead 28.

The logic signal on lead 28 is supplied to a conventional hold means circuit 30 responsive to the total fuel quantity signal on lead 23. When the logic signal on lead 28 is negative or a zero, the hold circuit 30 is open, that is, it passes the fuel quantity signal on lead 23 to lead 31 and thence to the input of a summing junction or means 32. This signal is added to the zero fuel weight signal on lead 15 to supply at the output 33 of junction 32 a signal corresponding to the total existing weight of the aircraft during level and unaccelerated flight. However, when the logic signal on lead 28 is positive or a one, it activates the hold circuit 30 such that it holds the then existing value of the total fuel quantity sensor signal on lead 31 and applies the value to the junction 32.

The logic output signal on lead 28 of threshold detector 27 is also supplied to an inverter means 35 which reverses the logic signal at its output lead 36. Thus, when the detector logic signal on lead 28 is negative or a zero, the logic signal on lead 36 is positive or a one, and vice versa. In accordance with the present invention, when this signal exceeds the pitch attitude and/or longitudinal acceleration threshold, the fuel weight measure from the fuel quantity sensors 16, 17 and 18 are interrupted and held by a hold circuit 30 and a fuel weight signal derived from an alternate source is substituted. A preferred embodiment of this alternate source is illustrated in the lower portion of FIG. 1, although it will be understood that such alternate source of fuel flow rate may be derived from fuel flow sensors normally included in the aircraft's fuel system. It will also be understood that such fuel flow sensors may be used as backups for the fuel flow computer of FIG. 1.

Figure 2:
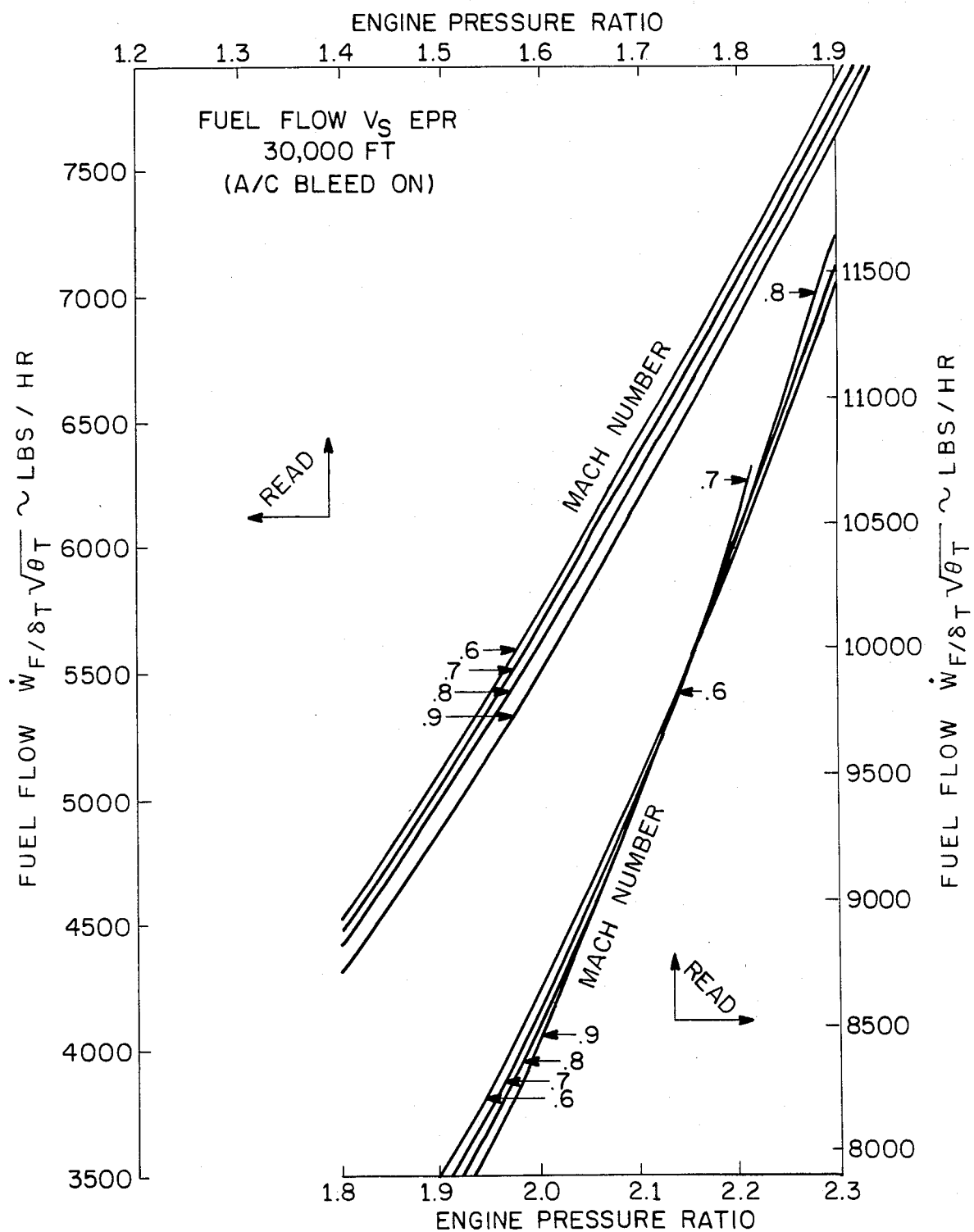
FIG. 2 is a graph relating engine and air data parameters to fuel flow and useful in understanding the fuel flow computation of FIG. 1.

The aerodynamic/engine performance characteristics of a particular aircraft are determined by the aircraft manufacturer to a very high degree of sophistication. One of these characteristics is the fuel flow in pounds per hour under various flight and engine operating conditions. More specifically, the aircraft manufacturer determines the fuel flow (for each engine of a multi-engined aircraft) versus engine pressure ratio (EPR) at specific normal cruise Mach numbers and at given altitudes and outside air temperatures. This data is recorded in graphical format and included in the performance manual for the particular aircraft. A typical example of such fuel flow versus EPR data for a particular engine is illustrated in FIG. 2. Note that this specific set of data is for an aircraft flying at 30,000 feet altitude with the engine's air conditioner bleed on. It should be appreciated that a plurality of similar graphs are plotted for successive five thousand foot altitudes and different engine bleed configurations. Analysis has determined that it may be assumed that the fuel flows for Mach numbers less than 0.6 do not change significantly so that for such lower Mach numbers the fuel flow values for 0.6M are used. Furthermore, the fuel flow indicated is corrected for the existing atmospheric pressure $\delta$ and existing total air temperature at the engine inlet. For use in the present invention, the numerical fuel flow data defined by all of these graphs for each engine is stored in a suitable data base or memory means, such as a digital read-only memory or EROM, which memory is conventionally addressed by the indicated variables, EPR, Mach number and altitude. This corrected fuel flow versus EPR data base, including conventional microprocessor controlled conversion, address and readout apparatus is illustrated at 40A, 40B, 40C in FIG. 1 for each engine, respectively.

As discussed above, the alternate source of fuel weight measure is a function of EPR, Mach number, altitude, atmospheric pressure and total air temperature and hence measures of these variables are provided. Each aircraft engine includes engine pressure ratio sensors and for the three-engine embodiment of FIG. 1, these are shown at 41, 42 and 43 and provide individual signals on leads 43, 44 and 45 proportional to their respective EPR's. Most modern transport type aircraft include conventional air data computers for supplying various air data based parameters to the many users of such information on the aircraft, such as display instruments, flight controls, etc. Thus, air data computer 46 supplies an electrical output signal on lead 47 proportional to Mach number speed M, a signal on lead 48 proportional to aircraft altitude h and a signal on lead 49 proportional to total pressure ratio $\delta_T$, where $$\left[ \delta_T = \frac{p_T}{p_o} \right]$$

and where
$p_T$ = pitot pressure
$p_o$ = standard sea level pressure
A further signal $\theta_T$ on lead 50 proportional to total air temperature TAT at the engine inlet is provided by a conventional temperature probe 51.

The EPR, Mach number and altitude signals are supplied to the fuel flow computers 40A, 40B, 40C where under conventional microprocessor control, the signals are A/D converted as necessary and used to address the data base memory for retrieving the corrected fuel flow in pounds per hour for each of the existing engine EPR's, Mach speed and altitude, which individual engine fuel flow signals are summed at junction 70 to provide an output signal on lead 55 proportional to the total corrected fuel flow rate to the engines. Since, as illustrated in FIG. 2, the fuel flow rate includes the essentially fixed pneumatic factors $\delta_T$ and $\theta_T$ for the given conditions, that is, $W_F/\delta_T\sqrt{\delta_T}$, it is necessary to eliminate these terms from the signal on lead 55. A signal proportional to $\delta_T$ and TAT appear on leads 49 and 50, respectively. The TAT signal on lead 50 is applied to a conventional square root circuit 57, the output of which is supplied as one of the inputs on lead 60 to a conventional multiplier 61, the other input thereto being the $\delta_T$ signal on lead 49. The output signal on lead 62, therefore, represents the product $\delta_T\sqrt{\delta_T}$. The latter signal is supplied to a further multiplier 63 also responsive to the corrected fuel flow rate signal on lead 55. Therefore, the resultant product signal on lead 64 is proportional to the actual fuel flow rate in pounds per hour to the engines.

In order to convert fuel flow rate to accumulated fuel weight, the fuel flow rate signal on lead 64 is supplied to an integrator means 65. The integrator 65 is conventional and includes also conventional electrical set and reset control 66 which receives and is responsive to the logic signal on lead 36. Set and reset control 66 is configured so that when the logic signal on lead 36 is positive or a one, corresponding to a negative or a zero on lead 28, the integrator function is initiated, that is, starts from zero and continues to integrate the fuel flow rate signal, and when the logic signal on lead 28 returns to negative or a zero and the logic signal on lead 36 returns to positive or a one, the integrator is stopped and reset to zero so as to ready for the next turn-on. The output of integrator 65, which when initiated represents the instantaneous computed fuel quantity from the alternate fuel quantity source, is supplied via lead 67 to a final summing junction 68 where it is subtracted from the fuel quantity sensor measure being held by hold means 30.

Thus it is appreciated that in operation when the signal on the lead 28 is logical zero, the resultant logical one signal on the lead 36 maintains the integrator 65 in its reset condition wherein the integrator stores the quantity zero. When the signal on the lead 28 switches to logical one, and the inverted signal on the lead 36 to logical zero, the reset condition is removed and the integrator 65 begins integrating the fuel flow rate signal on the lead 64. When the signal on the lead 28 returns to logical zero and the resultant signal on the lead 36 to logical one, the integrator 65 is again reset to zero and held in the reset state until the next occurrence of a logical one on the lead 28. Thus, when the output of the longitudinal acceleration sensor 25 is below the threshold of the threshold detector 27, the remaining fuel quantity signal on the lead 23 is applied through the hold circuit 30 to add to the zero fuel weight signal on the line 15 thereby providing the desired weight W on the lead 69. When the signal on the lead 26 from the longitudinal acceleration sensor 25 exceeds the threshold of the threshold detector 27, the extant fuel quantity value is held in the circuit 30 and the computed diminution of fuel value provided by the integrator 65 is subtracted from the signal on the lead 33 to continue to provide an accurate measure of aircraft weight on the lead 69. During the time interval that the signal on the lead 26 exceeds the threshold of the threshold detector 27, the fuel quantity signal on the lead 23 diminishes as the aircraft fuel is utilized by the engines. When the signal on the lead 26 returns to less than the threshold of the threshold detector 27, the signal on the lead 67 is reset to zero and the then extant fuel quantity signal on the lead 23 is reapplied through the hold circuit 30 to the summing junction 32. Thus, it is appreciated that during the time that the signal on the lead 36 is in the logical one state, the signal on the lead 67 supplements the held fuel weight measure in the hold circuit 30 to provide an accurate diminishing fuel weight measure during the time that the fuel quantity sensors 16, 17 and 18 are inaccurate.

Therefore, when the weight signal supplied by the fuel quantity sensors is not reliable due to aircraft non-level pitch attitudes and/or longitudinal accelerations exceeding ±3°, its last value is held and the computed fuel flow rate is integrated, the resultant computed fuel quantity or fuel weight measure being subtracted from that being held so that the final fuel quantity or weight measure on output lead 69 represents an accurate measure of total aircraft weight during such periods.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. In an engine powered aircraft, an apparatus for providing a continuous measure of the total in-flight weight comprising:
   means for supplying a first total in-flight aircraft weight measure dependent upon the sum of zero fuel weight of the aircraft and weight of fuel in fuel tanks as derived from fuel level sensors disposed within said fuel tanks, and
   means independent of said fuel level sensors for computing and providing a measure of the weight of fuel supplied to the aircraft engines,
   wherein said independent fuel weight measure providing means comprises:
   computer means responsive to an engine operation parameter, aircraft speed and aircraft altitude for providing a measure of the rate of fuel flow to said engine,
   integrator means responsive to said fuel flow measure for providing a measure of the weight of fuel being consumed by said engine,
   means responsive to aircraft flight conditions, said flight conditions render said fuel level sensors inaccurate, and
   means responsive to said last-mentioned means for holding said fuel level sensor derived fuel weight measure and for subtracting from said sensor derived measure said computed fuel weight measure to thereby provide a second total in-flight aircraft weight measure during said aircraft flight conditions.

2. The apparatus as set forth in claim 1 wherein said engine operation parameter is the engine's pressure ratio and said aircraft speed is Mach number speed.

3. The apparatus as set forth in claim 2 wherein said computer means includes:
   data base means including numerical measures of the rate of fuel flow to the engines as a function of engine EPR, aircraft Mach number and altitude,
   means for providing a signal representative of engine pressure ratio,
   means for providing signals representative of aircraft speed and altitude, and
   means for deriving from said data base and from said signals representative of engine pressure ratio, aircraft speed and altitude, a further signal representative of the rate of fuel flow to said engine.

4. The apparatus as set forth in claim 1 wherein said aircraft flight condition responsive means includes:
   accelerometer means for sensing and providing an output measure of aircraft attitude and longitudinal accelerations.

5. The apparatus as set forth in claim 4 wherein said accelerometer means comprises a liquid level sensor.

6. The apparatus as set forth in claim 1 or 4 wherein said holding and subtracting means comprises:
   threshold detector means responsive to said accelerometer means for providing a logic signal having one state upon said accelerometer output measure exceeding a predetermined value, and another state upon said accelerometer output less than said predetermined value,
   measure holding means responsive to said one state of said logic signal for holding said total fuel weight measure provided by said fuel level sensor means,
   means also responsive to said one state of said logic signal for initiating the operation of said integrator means, and
   means for subtracting from said fuel level sensor measure said integrator measure.

7. The apparatus as set forth in claim 6 further including:
   further means responsive to the other state of said logic signal for deactivating said holding means and said integrator means and for resetting said integrator measure to zero.

* * * * *